(12) United States Patent
Charbonneau-Lefort et al.

(10) Patent No.: US 9,294,290 B2
(45) Date of Patent: Mar. 22, 2016

(54) OPTICAL CABLE ASSEMBLIES WITH LOW-SPEED DATA PASS-THROUGH ARCHITECTURE AND SLEEP MODE OPERATION

(71) Applicant: CORNING OPTICAL COMMUNICATIONS LLC, Hickory, NC (US)

(72) Inventors: Mathieu Charbonneau-Lefort, San Jose, CA (US); Michael John Yadlowsky, Sunnyvale, CA (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 66 days.

(21) Appl. No.: 14/331,504

(22) Filed: Jul. 15, 2014

(65) Prior Publication Data

US 2016/0020912 A1   Jan. 21, 2016

(51) Int. Cl.
*H04B 10/00* (2013.01)
*H04L 12/12* (2006.01)
*H04B 10/40* (2013.01)
*H04B 10/25* (2013.01)

(52) U.S. Cl.
CPC ............... *H04L 12/12* (2013.01); *H04B 10/25* (2013.01); *H04B 10/40* (2013.01)

(58) Field of Classification Search
USPC ............................... 398/135–139; 385/88–92
See application file for complete search history.

(56) References Cited

U.S. PATENT DOCUMENTS

| | | | | |
|---|---|---|---|---|
| 6,810,216 B1 * | 10/2004 | Tourunen | ............... | H04B 10/10 330/51 |
| 8,083,417 B2 * | 12/2011 | Aronson | ............... | G02B 6/3817 385/14 |
| 8,180,225 B2 * | 5/2012 | Werthen | ............... | G06F 13/385 398/135 |
| 8,340,526 B2 * | 12/2012 | Camilli | ............... | H04B 10/272 398/104 |
| 8,384,250 B2 * | 2/2013 | Underwood | ......... | G02B 6/3895 307/147 |
| 8,403,571 B2 * | 3/2013 | Walker | ............... | G06F 13/4086 385/15 |
| 8,534,931 B2 * | 9/2013 | Miller | ....................... | G06F 1/32 385/100 |

(Continued)

FOREIGN PATENT DOCUMENTS

| | | | | |
|---|---|---|---|---|
| JP | 2013-137479 A | 7/2013 | ............... | G02B 6/42 |
| WO | WO2013/147816 A1 | 10/2013 | ............... | G02B 6/38 |

*Primary Examiner* — Agustin Bello

(57) ABSTRACT

Optical cable assemblies, optical engines, and methods for transitioning into and out of a sleep mode are disclosed. In one embodiment, a method of operating a sleep mode of an optical cable assembly includes receiving a sleep trigger, and for a time $T_1$, turning a laser of an optical transmit (Tx) lane of an optical transceiver device on or off, and providing a fixed logical high or a fixed logical low on low-speed receive (Rx) line of the optical cable assembly based on a connection state of an electrical connector of the optical cable assembly. The method further includes, after the time $T_1$, turning off the laser of the optical Tx lane, placing one or more components of the optical transceiver device into a low-power state, and periodically transmitting an optical intra-cable signal from the optical transceiver device over optical fiber to a far end of the optical cable assembly.

25 Claims, 7 Drawing Sheets

(56) References Cited

U.S. PATENT DOCUMENTS

| | | | | |
|---|---|---|---|---|
| 8,559,814 B2 * | 10/2013 | Horishita | ............ | H04L 12/2861 398/25 |
| 8,761,560 B1 * | 6/2014 | Sanderson | ........... | G02B 6/4415 385/100 |
| 8,824,838 B2 * | 9/2014 | Walker | ................ | G06F 13/4086 385/14 |
| 8,876,411 B2 * | 11/2014 | Miller | ....................... | G06F 1/32 385/100 |
| 9,160,451 B2 * | 10/2015 | Hung | ................. | H04B 10/2575 |
| 9,160,452 B2 * | 10/2015 | Louderback | ......... | H04B 10/077 |
| 2002/0046355 A1 * | 4/2002 | Takeuchi | .............. | G06F 1/3203 713/320 |
| 2007/0237462 A1 * | 10/2007 | Aronson | .............. | G02B 6/4292 385/89 |
| 2008/0037987 A1 * | 2/2008 | Bradley | ................ | H04J 3/0644 398/59 |
| 2009/0196621 A1 * | 8/2009 | Chen | ................... | G06F 13/4027 398/115 |
| 2013/0236188 A1 * | 9/2013 | Hung | .................... | H04B 10/25 398/116 |
| 2013/0279920 A1 * | 10/2013 | Herzog | ................... | G02B 6/36 398/212 |

* cited by examiner

OPTICAL CABLE ASSEMBLIES WITH LOW-SPEED DATA PASS-THROUGH ARCHITECTURE AND SLEEP MODE OPERATION

BACKGROUND

1. Field

The present disclosure generally relates to optical communication and, more particularly, to optical cable assemblies, optical engines and methods for transitioning an optical communications link into and out of a sleep mode.

2. Technical Background

As the data rate of communication protocols increases, it becomes difficult to transmit signals using purely electrical cables. Optical communication has provided a solution to the distance versus data rate problem for the telecommunication and data center markets. Benefits of optical fiber include longer reach, extremely wide bandwidth and low noise operation. Because of these advantages, optical fiber is increasingly being used for a variety of applications, including, but not limited to, broadband voice, video, and data transmission. Optical fiber is emerging as the lowest cost and most compact interconnect technology in an increasing number of consumer electronics applications, especially at lengths greater than a few meters.

Some data transmission interfaces require low-speed data (e.g., control data at data rates such as 1 Mb/s) to be transmitted simultaneously with high-speed data (e.g., 10 Gb/s and beyond). However, the additional low-speed data require an additional transmission medium, such as copper conductors or additional optical fibers. The additional transmission medium may increase the diameter of the optical cable, and, in the case of copper conductors, require DC isolation between ends of the optical cable as well as provide additional shielding requirements due to electro-magnetic interference concerns.

The ability to detect physical or logical disconnect events of an optical cable assembly while in a low power state is a challenge because it requires some form of communication between the ends of the optical cable assembly. In a traditional copper cable assembly, the process of detecting a disconnect event is relatively simple because all that is needed is to determine whether or not one or more of the copper wires spanning the length of the cable assembly is connected at both ends.

SUMMARY

Embodiments of the present disclosure are directed to transmission of high-speed data and low-speed data across one or more optical fibers without the need for additional optical fibers or bulky electrical conductors. More specifically, embodiments are directed to optical engines and optical cable assemblies incorporating optical engines that are capable of optically communicating both relatively low-speed data signals and relatively high-speed data signals over optical fibers without the need for additional transmission medium for the low-speed data signals, and without the complication of receiving and resending the low-speed data signals (i.e., a "pass-through" architecture).

More specifically, embodiments described herein are directed to optical engines, optical cable assemblies, and methods for transitioning a communications link capable of transmitting and receiving low-speed signals (e.g., control signals and/or management signals) in a pass-through architecture into and out of a low-power sleep mode. Embodiments described herein further prevent intra-cable signals from being passed to connected host devices or electronic devices during sleep mode.

In one embodiment, a method of operating a sleep mode of an optical cable assembly having an optical transceiver device includes receiving a sleep trigger at the optical cable assembly, and for a time $T_1$, turning a laser of an optical transmit (Tx) lane of the optical transceiver device on or off and providing a fixed logical high or a fixed logical low on low-speed receive (Rx) line of the optical cable assembly based on a connection state of an electrical connector of the optical cable assembly. The method further includes, after the time $T_1$, turning off the laser of the optical Tx lane and maintaining the fixed logical high or the fixed logical low on the low-speed Rx line of the optical cable assembly, placing one or more components of the optical transceiver device into a low-power state, and periodically transmitting an optical intra-cable signal from the optical Tx lane of the optical transceiver device over an optical fiber to a far end of the optical cable assembly.

In another embodiment, an optical engine includes a low-speed Rx line and an optical transceiver device. The optical transceiver device includes a laser control input, an optical detect output, and an optical Tx lane, wherein the optical transceiver device converts an electrical Tx signal into an optical Tx signal by a laser of the optical Tx lane. The optical transceiver device further includes an optical Rx lane, wherein the optical transceiver device converts an optical Rx signal into an electrical Rx signal, and a control circuit communicatively coupled to the low-speed Tx line, the low-speed Rx line, the laser control input, and the optical detect output. The control circuit is configured to receive a sleep trigger, provide a logical high or a logical low on the laser control input for a time $T_1$ and provide a fixed logical high or a fixed logical low on the low-speed Rx line based on a connection state of the optical link, maintain the fixed logical high or the fixed logical low on the low-speed Rx line, turn off the laser of the optical Tx lane, place one or more components of the optical transceiver device into a low-power state, periodically transmit an optical intra-cable signal from the optical Tx lane of the optical transceiver device, and receive an optical intra-cable signal at the optical Rx lane.

In yet another embodiment, an optical cable assembly includes an optical cable having a first end and a second end, a first electrical connector disposed at the first end of the optical cable, and a second electrical connector disposed at the second end of the optical cable. The optical cable includes a plurality of optical fibers. Each of the first electrical connector and the second electrical connector includes a housing and an optical engine disposed within the housing. The optical engine includes a low-speed Rx line, an optical transceiver device, and a control circuit. The optical transceiver device includes a laser control input, an optical detect output, an optical Tx lane optically coupled to a first optical fiber, and an optical Rx lane optically coupled to a second optical fiber. The optical transceiver device converts an electrical Tx signal into an optical Tx signal by a laser of the optical Tx lane, and the optical transceiver device converts an optical Rx signal on the second optical fiber into an electrical Rx signal. The control circuit is communicatively coupled to the low-speed Tx line, the low-speed Rx line, the laser control input, and the optical detect output. The control circuit is configured to receive a sleep trigger, provide a logical high or a logical low on the laser control input for a time $T_1$ and provide a fixed logical high or a fixed logical low on the low-speed Rx line based on a connection state of the electrical connector, maintain the fixed logical high or the fixed logical low on the low-speed Rx line, turn off the laser of the optical Tx lane, place one or more components of the optical transceiver device into a low-power state, periodically transmit an optical intra-cable signal from the optical Tx lane of the optical transceiver device over an optical fiber to a far end of the optical cable assembly, and receive an optical intra-cable signal from the far end of the optical cable assembly.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
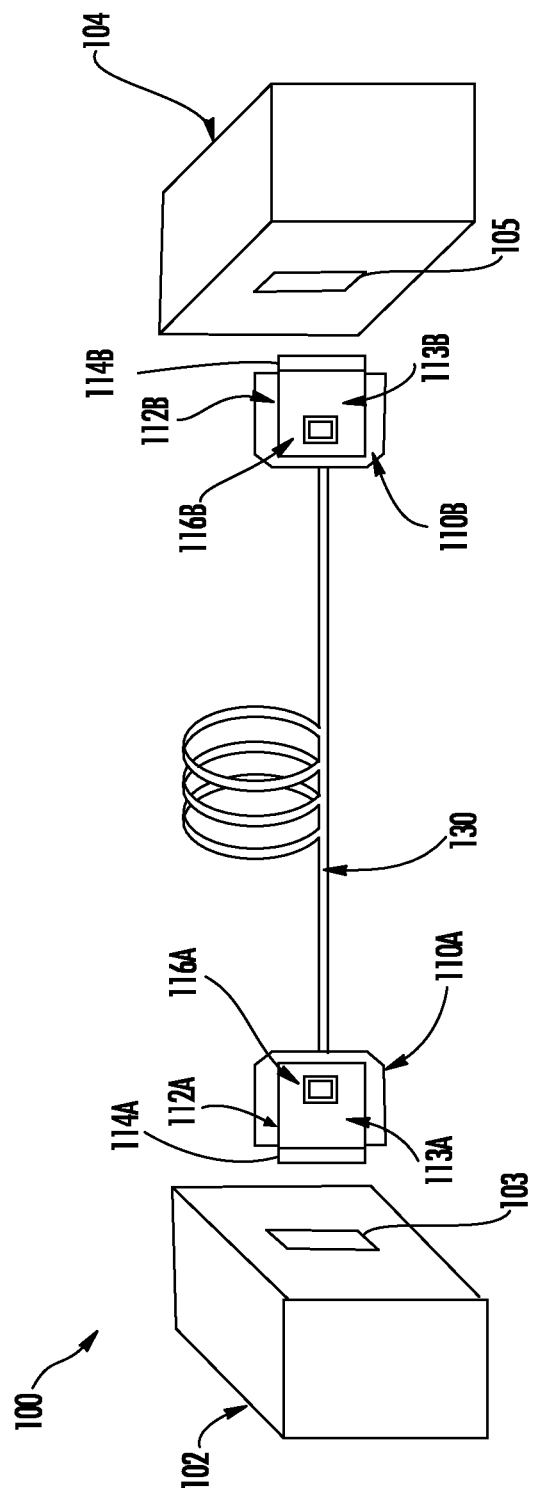
FIG. 1 schematically depicts an example optical cable assembly connected to two electronic devices according to one or more embodiments described and illustrated herein.

Embodiments of the present disclosure are directed to optical engines, optical cable assemblies incorporating optical engines, and methods for providing a sleep mode as well as communicating both payload data (provided by high-speed signals) and management/control data (provided by low-speed signals) over optical fibers. More specifically, embodiments of the present disclosure enable components of the optical engine to transition into a low power sleep mode that communicates optical intra-cable signals to a far end of the optical cable assembly to determine if the far end is still connected to an electronic device while also preventing optical fiber-side signals from being transmitted to an external host or electronic device during the sleep mode. Accordingly, embodiments of the present disclosure provide mechanisms for ensuring the coordinated transition of both optical cable ends into and out of the low-power sleep mode.

Additionally, embodiments are directed to providing a sleep mode operation in a low-speed data "pass through" architecture. More specifically, embodiments of the present disclosure are directed to optical engines and optical cable assemblies incorporating optical engines capable of communicating both payload data (provided by high-speed signals) and management/control data (provided by low-speed signals) over optical fibers. The low-speed signals have a data rate that is lower than the high-speed payload data signals. As an example, a high-speed signal is 10× or more faster than a low-speed signal, but other multiples of speed are possible between low-speed signals and high-speed signals. For instance, the high-speed signal may be 100× faster than a low-speed signal, and may even be faster.

Some communication protocols require transmission of management or control data to maintain the communications link. Such data may include cable manufacture identification number, cable connection status, transmission status, and any other data required by the communication protocol. Embodiments of the present disclosure enable the transmission of low-speed signals representing data such as management/control data over a fiber communications link without additional transmission medium (e.g., copper wires or additional optical fibers) or costly transmission circuitry for receiving and resending the low-speed data. More specifically, embodiments of the present disclosure allow low-speed signals representing management or control data to "pass through" the optical engine within the connector of the optical cable assembly. As used herein, the term "pass-through" means that the low-speed signals are routed directly through the connector without being received and then resent by a microcontroller or other processing component.

Various embodiments of optical engines, optical cable assemblies incorporating optical engines, and methods for providing a sleep mode in a low-speed data pass-through architecture are described in detail below. It is noted that FIGS. 1-6 illustrate various embodiments of optical engines for providing the pass through architecture, while FIG. 7 and the related description illustrates and describes the sleep mode functionality.

Referring now to FIG. 1, an optical cable assembly 100 is schematically illustrated. Generally, the optical cable assembly 100 comprises a first electrical connector 110A at a first end of an optical cable 130 and a second electrical connector 110B at a second end of the optical cable 130. The first and second electrical connectors 110A, 110B include a plug portion 114A, 114B, respectively, having electrical contact that mate with a receptacle 103, 105 of an electronic device 102, 104, respectively. In other embodiments, the first and/or second electrical connectors 110A, 110B are configured as a receptacle for mating with a plug of an electronic device. The electronic devices 102, 104 may be any electronic device including, but not limited to, a server device, a personal computer, an external storage device, a photographic device, a display device, a cellular phone, and a media player.

An optical engine 112A, 112B resides in first and second electrical connectors 110A, 110B of the optical cable assembly 100 that is responsible for realizing the electrical-to-optical conversion and optical-to-electrical conversion. The optical engines 112A, 112B may comprise a printed circuit board assembly 113A, 113B that maintains an optical transceiver device 116A, 116B and other electronic components for electro-optical and opto-electrical conversion.

The optical cable assemblies described herein are active optical cable assemblies in the sense that they actively convert optical and electrical signals within the cable. As described in more detail below, the optical engines 112A, 112B convert high-speed electrical signals (i.e., payload data) into high-speed optical signals inside the first and second electrical connector 110A, 110B, which are transmitted over optical fibers and converted back to the electrical domain inside the electrical connector at the opposite end of the optical cable assembly 100. The optical engines 112A, 112B further include an optional optical module (not shown) to couple the light in and out of optical fibers within the optical cable 130. Active optical cables are attractive for many consumer applications because they provide familiar tested electrical interfaces while providing the optical transport advantages of optical fiber communication.

As stated above, embodiments of the present disclosure may utilize any communications protocol where low-speed control data is sent in addition to high-speed payload data. For example, interconnects may include two bi-directional high-speed lanes with a separate bi-directional low-speed channel to manage the state of the communications link provided by a cable assembly. Concepts described herein may be utilized in any application wherein a communications protocol requires low-speed data transmission in addition to high-speed payload data transmission.

Figure 2:
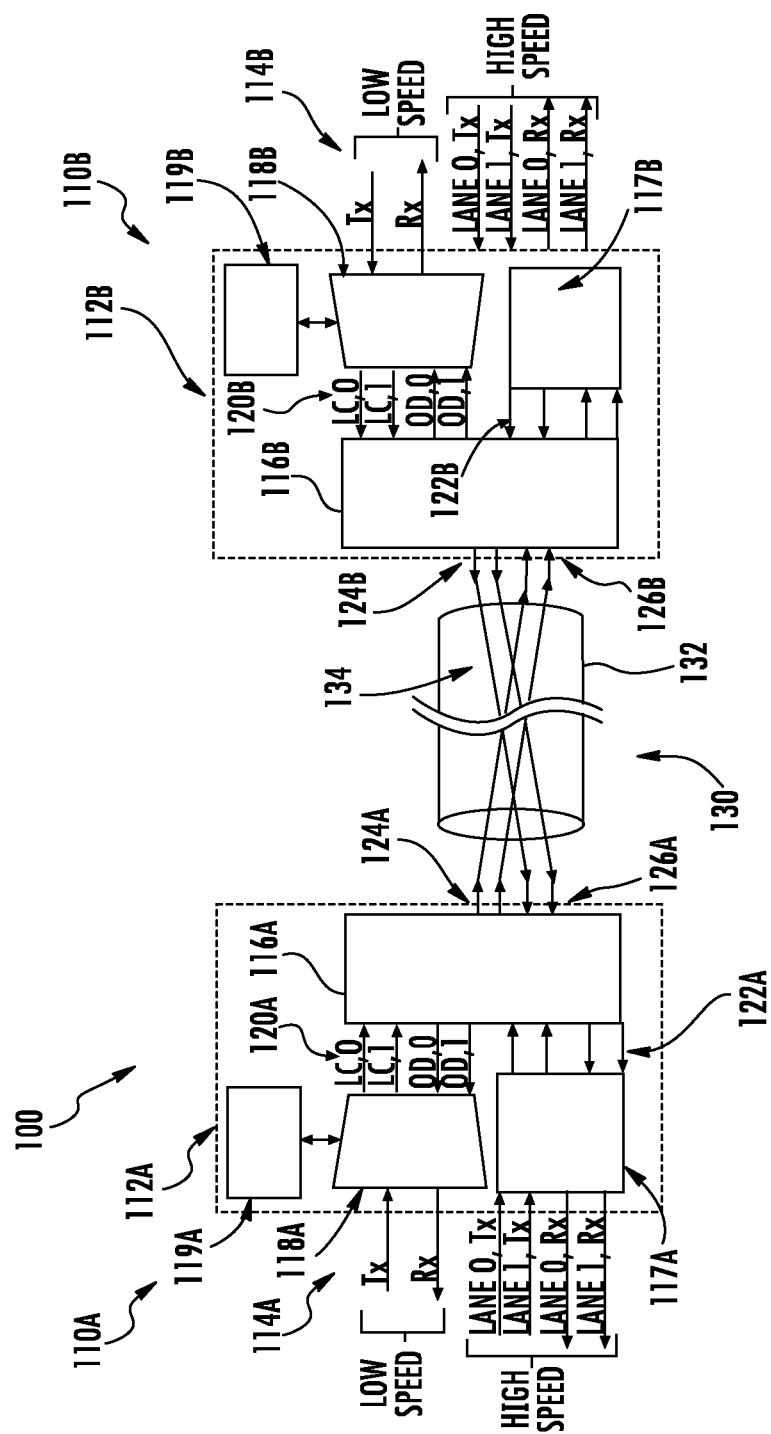
FIG. 2 schematically depicts optical engines within electrical connectors of an optical cable assembly according to one or more embodiments described and illustrated herein.

Referring now to FIG. 2, the optical cable assembly 100 is schematically illustrated in greater detail. Each electrical connector 110A, 110B includes a plug portion 114A, 114B providing electrical contacts for two high-speed Tx lanes (lane 0 Tx and lane 1 Tx), two high-speed Rx lanes (lane 0 Rx and lane 1 Rx), a low-speed Tx line and a low-speed Rx line. Lane 0 is a first high-speed data lane while lane 1 is a second high-speed data lane. It should be understood that any number of high-speed data lanes may be used.

The optical engine 112A, 112B includes an optical transceiver device 116A, 116B, a microcontroller 119A, 119B, and a control circuit for routing low-speed signals as described in detail below. In some embodiments, a signal conditioning circuit 117A, 117B may be provided to condition the high-speed signals on high-speed lanes 1 and 0. The signal conditioning circuit 117A, 117B may provide functionality such as retiming, equalization, pre-emphasis, de-emphasis, and the like. The conditioned signals may then be passed to the optical transceiver device 116A, 116B by high-speed inputs and outputs 122A, 122B (i.e., high-speed data lanes).

The optical transceiver device 116A, 116B comprises both optical transmitters and receivers. Typically, the transmitters are vertical-cavity surface-emitting lasers (VCSELs) and the receivers are photodiodes. The lasers are driven by a laser driver integrated circuit ("IC"), and the signal generated by the photodiodes is amplified using a trans-impedance amplifier circuit ("TIA"), typically followed by a limiting amplifier. In some embodiments, both transmit and receive functions of the optical transceiver device 116A, 116B are integrated in a single transceiver IC. In other embodiments, the transmit function and the receive function are provided in separate ICs. Laser driver ICs typically have "laser control" ("LC") pins that turns on each laser, and TIAs provide "optical detect" ("OD") signals indicating that light is being received by a photodiode.

In the illustrated embodiment, the control circuit 118A, 118B is electrically coupled to the microcontroller 119A, 119B, as well as to the optical transceiver device 116A, 116B by inputs/outputs 120A, 120B. The inputs/outputs 120A, 120B of the illustrated embodiment include a first laser control pin (labeled as "LC, 0" in FIG. 2), a second laser control pin (labeled as "LC, 1" in FIG. 2), a first optical detect pin (labeled as "OD, 0" in FIG. 2) and a second optical detect pin (labeled as "OD, 1" in FIG. 2). Other embodiments may include more or fewer laser control pins and/or optical detect pins.

The optical transceiver device 116A, 116B has optical outputs 124A, 124B (i.e., optical Tx lanes) and optical inputs 126A, 126B (i.e., optical Rx lanes) for lane 0 and lane 1. Each optical output 124A, 124B and optical input 126A, 126B is optically coupled to an optical fiber 134 within an outer jacket 132 of the optical cable 130. Both high-speed signals and low-speed signals are communicated between ends of the optical cable assembly 100 over the optical fibers 134.

Rather than providing additional transmission medium (e.g., copper wires or optical fibers) for the low-speed signals representing low-speed data (e.g., management data or control data), or receiving and resending low-speed data (which may be costly due to the timing requirements of the particular protocol), embodiments of the present disclosure let the low-speed data travel without digital modification to and from the optical transceiver device 116A, 116B by using the control circuit 118A, 118B to route the low-speed signals representing the low-speed data. As a result, the microcontroller 119A, 119B does not need to meet the same tight timing requirements as the receiving and resending method. The microcontroller 119 only has to route the traffic over the desired lane, and to carry out tasks related to link maintenance, such as blocking low-speed traffic in active mode, or maintaining the link during sleep mode operation. In this manner, embodiments allow the use of a general-purpose, lower-performance microcontroller, and relaxes the timing requirements that the microcontroller has to satisfy.

As described in more detail below, the on-board microcontroller 119A, 119B listens to data packets (low-speed and/or high-speed data packets), interprets them and configures the control circuit 118A, 118B to reflect the state of the communications link provided by the optical cable assembly 100.

In this manner, the control circuit 118A, 118B selectively routes low-speed signals (either low-speed Tx signals on the low-speed Tx line or an on-board Tx signal from the microcontroller 119A, 119B) to one of the laser control pins of the optical transceiver device 116A, 116B in real time. As used herein, "real time" means that the signals are not intercepted and then re-sent by a microcontroller, which causes a delay. The optical transceiver device 116A, 116B converts the low-speed signal received at the laser control pin into an optical signal that is sent over one of the optical fibers 134.

The control circuit 118A, 118B also selectively routes low-speed Rx signals converted from low-speed optical Rx signals by the optical transceiver device 116A, 116B to the microcontroller 119A, 119B or the low-speed Rx line depending on the state of the communication link. Further, the control circuit 118A, 118B may also selectively route a low-speed signal from the microcontroller 119A, 119B (i.e., an on-board Tx signal) to the low-speed Rx line.

Figure 3:
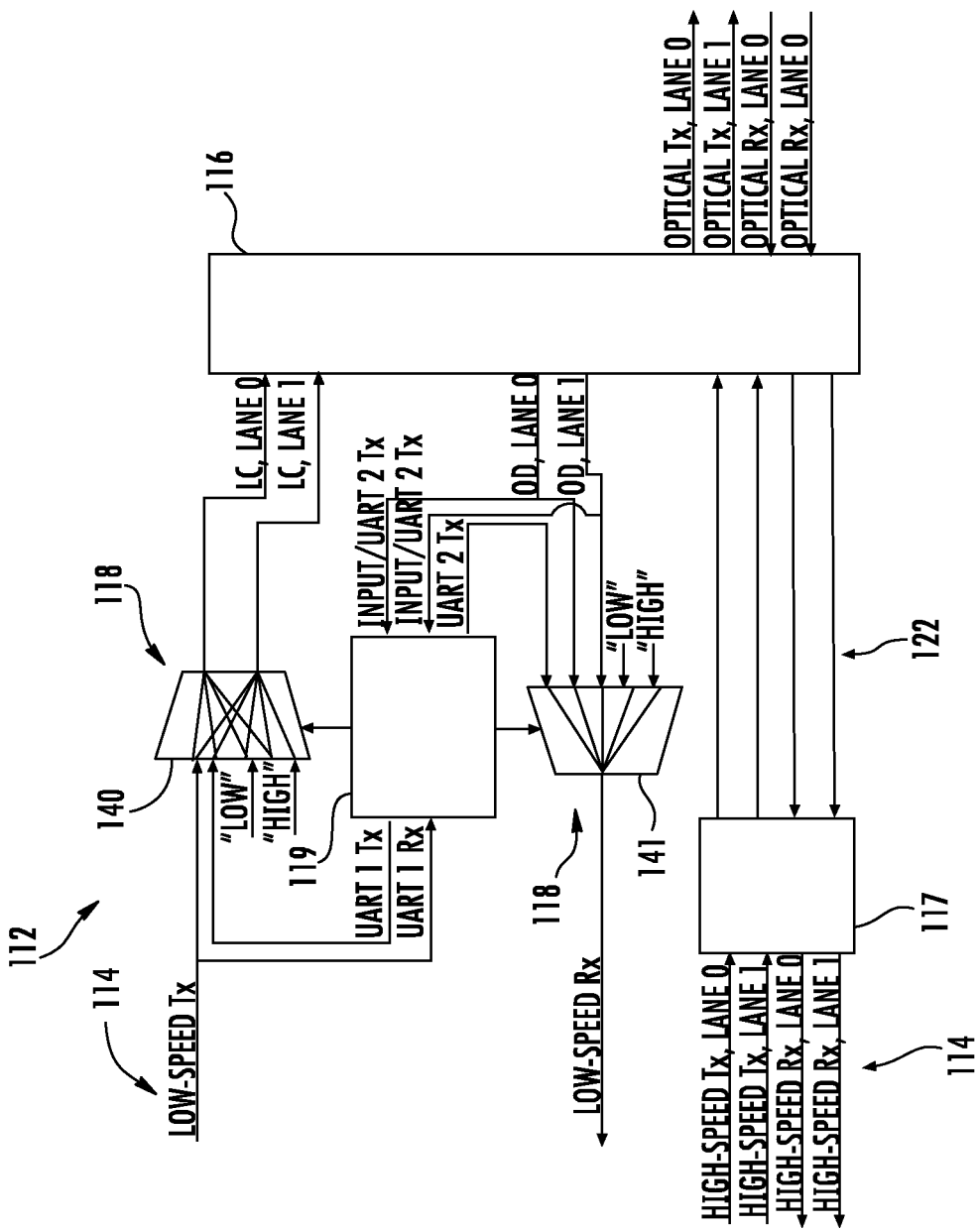
FIG. 3 schematically depicts an example optical engine incorporating multiplexers according to one or more embodiments described and illustrated herein.

FIG. 3 schematically depicts an optical engine 112 within an electrical connector of an optical cable assembly. It is noted that FIG. 3 only depicts components of one end of an optical cable assembly for ease of illustration and description. For example, the optical engine 112 and its components depicted in FIG. 3 may apply to the optical engines 112A, 112B and other components depicted in FIGS. 1 and 2.

More specifically, FIG. 3 schematically depicts an example microcontroller 119 and example control circuit 118 in greater detail. Generally, the control circuit 118 provides a circuit architecture for link management and control signals (relatively low-speed signals) and payload (relatively high-speed signals) traffic over the same set of optical fibers 134 (see FIG. 2). This architecture lets the data travel uninterrupted to and from the laser driver and trans-impedance amplifier of the optical transceiver device 116, by routing the traffic instead of intercepting and re-transmitting the packets.

The control circuit 118 is provided to connect the management signals from the connected electronic device on the low-speed Tx and Rx lines, or the on-board Tx and Rx signals provided by the microcontroller 119 to the inputs and outputs of the optical transceiver device 116. Microcontrollers 119 in each end of the optical cable assembly 100 monitor the control signals and drive the control circuit 118.

The illustrated microcontroller 119 has two universal asynchronous receiver transmitter ("UART") ports providing serial transmit pins and serial receive pins. The transmit pins of the two UART ports are labeled as UART 1 Tx and UART 2 Tx, while the receive pins of the two UART ports are labeled as UART 1 Rx and UART 2 Rx. It should be understood that the microcontroller 119 may include more than two UART ports. As shown in FIG. 3, two pins of the microcontroller 119 may be configured as input ports.

The optical transceiver device 116 receives low- or high-speed modulation signals and generates the appropriate electrical signals to control the optical transmitter, which in one embodiment is configured as a VCSEL. In the example embodiment, the laser control pins ("LC, lane 0" or "LC, lane 1") of the transceiver are driven high to turn the VCSELs on and low to turn them off for low speed transmission. For high-speed transmission, the laser control pin is held high while the high-speed data signals determine the modulation of the laser.

Similarly, the optical transceiver device 116 detects low and high speed modulation of the received optical signal. It drives the optical detect pins ("OD, lane 0" and "OD, lane 1") high when light is received by the photodiodes and low otherwise. Accordingly, the optical detect pins are used to receive low-speed optical Rx signals in the current example.

The control circuit 118 may be divided into two groups. The transmit path provides an interface between the low-speed Tx line and the laser control pins which control the VCSELs of the optical transceiver device 116, while the receive path connects the optical detect pins reflecting the state of the photodiodes to the low-speed Rx line.

In the illustrated embodiment, the control circuit 118 is defined by a 4-to-2 multiplexer 140 on the transmit path and a 5-to-1 multiplexer on the receive path. Signal routing options and examples of typical use cases of the circuit depicted in FIG. 3 are provided in Table 1.

TABLE 1

| State | Function | Example implementation: Signal routed to either laser control (LC) pin |
|---|---|---|
| Transmit low-speed transmit traffic over either fiber | Transmit low-speed traffic over whichever fiber is not used to carry high-speed data | Low-speed Tx |
| Allow on-board microcontroller to transmit over either fiber | Re-transmit packets to far-end; transmit intra-cable packets | UART 1 Tx |
| Turn either or both VCSEL off | Intra-cable signaling; sleep mode | "Low" |
| Turn either or both VCSEL on | Enable transmission of high-speed data; intra-cable signaling; sleep mode | "High" |

It is noted that "Low" or "High" in Table 1 mean that the voltage is held low or high, respectively. Referring to both Table 1 and FIG. 3, the microcontroller 119 controls the 4-to-2 multiplexer 140 to route the low-speed Tx signal present on the low-speed Tx line to either laser control pins LC, lane 0 or LC, lane 1. For example, one of the optical Tx lanes and fibers may be communicating high-speed payload data signals. In this case, the microcontroller 119 may control the 4-to-2 multiplexer 140 to route the low-speed Tx signal to the laser control pin associated with the idle optical Tx lane and fiber.

UART 1 Tx is an on-board Tx signal provided by the microcontroller 119. UART 1 Tx may be used to allow the microcontroller 119 to transmit its own data to the opposite end of the optical cable assembly. For example, the microcontroller 119 may need to send a sleep signal to the opposite end of the optical cable assembly, or send other intra-cable messages. The microcontroller 119 may control the 4-to-2 multiplexer to connect UART 1 Tx to either laser control pins LC, lane 0 or LC, lane 1 depending on which optical lane is not being used to transmit high-speed payload data signals.

The "Low" and "High" inputs are used to fix either laser control pin high or low depending on the state of the optical cable assembly, e.g., to provide a sleep mode operation, provide intra-cable signaling, enable or disable transmission of high-speed payload data signals, and the like.

On the receive path, the control circuit 118 is provided as a 5-to-1 multiplexer 141. Signal routing options and examples of typical use cases are listed in Table 2.

TABLE 2

| State | Function | Signal routed to low-speed Rx pin |
|---|---|---|
| Receive low-speed transmit traffic from either fiber | Receive low-speed traffic from whichever fiber is not used to carry high-speed data | OD, lane 0 or OD, lane 1 |
| Allow on-board microcontroller to transmit to near-end host or device | Communication to near-end host or device; loading firmware | UART 2 Tx |
| Hold the low-speed receive lane low | Intra-cable signaling; sleep mode | "Low" |
| Hold the low-speed receive lane low | Intra-cable signaling; sleep mode | "High" |

Tables 1 and 2 list various use cases where the functions provided by the control circuit 118 are desired. As stated above, one role of the control circuit 118 is to route the low-speed traffic (low-speed Tx signal or on-board Tx signal) to and from whichever fiber is not used to transport high-speed data. VCSELs used to transmit high-speed data are enabled by holding their laser-enable pin high.

If both optical fibers are being used for high-speed payload data, then low-speed data should not be transmitted as it would interrupt the high-speed traffic. Low-speed modulation of a lane used to carry high-speed data might be necessary however when de-provisioning the communications link provided by the optical cable assembly.

As stated above, it may be desirable to allow the on-board microcontroller 119 to send low-speed packets (i.e., on-board Tx signals) over the optical fibers to the other end of the optical cable assembly; this is done by routing the UART 1 Tx to either laser control pin. If these packets are intended to the far-end host or device, then the correct optical detect pin should be routed to the low-speed Rx line. However, if these are intra-cable packets (that is, intended to the far end on-board microcontroller but not the connected electronic device), then they should not be allowed to be transmitted to the far-end host or electronic device, which is accomplished by holding the low-speed Rx line high or low, depending on the state of the link.

In some cases, it may be desirable to allow the on-board microcontroller 119 to communicate with the near-end host or electronic device to which the optical cable assembly is connected. In this case, the microcontroller 119 may control the 5-to-1 multiplexer 141 to connect the UART 2 Tx pin of the microcontroller 119 to the low-speed Rx line.

In other cases, it may be desirable to issue simpler intra-cable signals to the other end of the optical cable assembly by turning either VCSEL on or off. In this case, these simple signals should be isolated from the far-end host or electronic device, again by controlling the state of the low-speed Rx line. Finally, in sleep mode operation it may be desirable to turn off the lasers or to issue pulses of light while holding the low-speed Rx line high or low depending on the state of the communications link.

In the illustrated embodiment, the UART 1 Rx pin of the microcontroller 119 is connected to the low-speed Tx line. This configuration allows the microcontroller 119 to monitor the low-speed traffic such that it is aware of the state of the communications link. Therefore, the microcontroller 119 may read the low-speed Tx signals that are transmitted. In some embodiments, the low-speed data provided by the low-speed Tx signals are stored within the microcontroller 119 for retransmission over the optical fibers using the UART 1 Tx pin (e.g., if both optical Tx lanes are busy with high-speed payload data transmission).

The microcontroller 119 is also coupled to the optical detect pins OD, lane 0 and OD, lane 1 such that it may sense the state of both optical detect signals in order to detect the presence of light on the photodiodes. The arrows between the microcontroller 119 and each multiplexer 140, 141 represent the control signals required to configure the state of the multiplexers.

There are many ways of implementing the control circuit 118 depicted in FIG. 2 and the multiplexer functionality depicted in FIG. 3. In some embodiments, both lasers of optical Tx, lane 0 and optical Tx, lane 1 on at all times except during sleep mode operation. This configuration provides for the following consequences: (1) either lane may be used at any time to carry high-speed data without modifying the state of the control circuit; (2) the low-speed Tx and Rx signals may be connected directly to the laser control pins and from the optical detect pins without the need to invert the signal because RS232 protocol used for low-speed signaling is idle high; and (3) on the receive path, the low-speed traffic can be obtained by combining the signals from both optical detect pins OD, lane 0 and OD, lane 1 using an AND gate, regardless of which fiber is used to carry the low-speed traffic.

Figure 4:
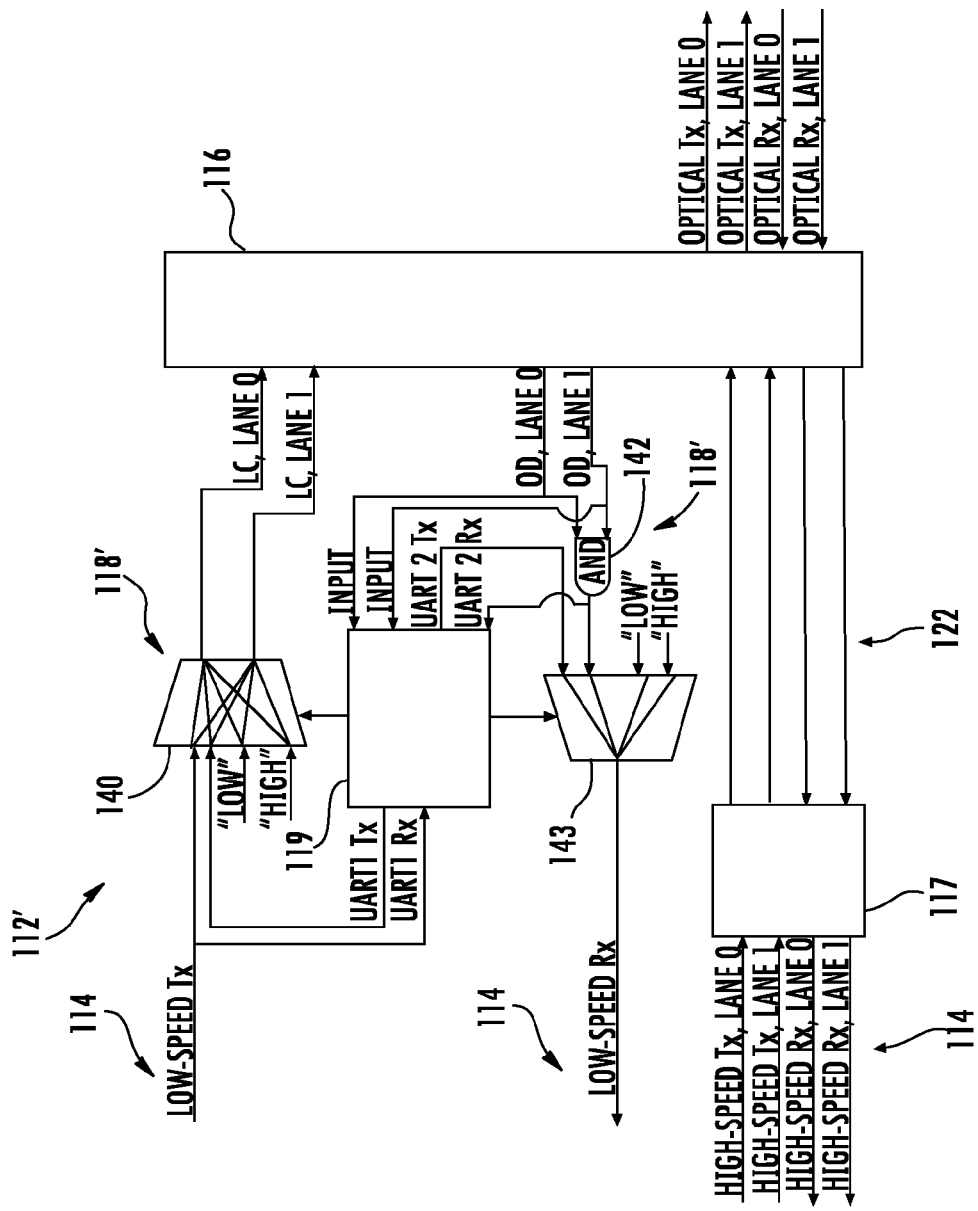
FIG. 4 schematically depicts an example optical engine incorporating an AND gate at the optical detect pins of an optical transceiver device and includes two multiplexers according to one or more embodiments described and illustrated herein.

Consequence number (3) above provides simplification of the design, because it relieves the on-board microcontroller 119 from having to decide which optical detect signal (i.e., OD, lane 0 or OD, lane 1) needs to be routed to the low-speed Rx line, thereby simplifying the management of the communications link. FIG. 4 schematically depicts an optical engine 112' having a control circuit 118' that includes an AND gate 142 with inputs coupled to OD, lane 0 and OD, lane 1. The output of the AND gate 142 is provided as an input to a 4-to-1 multiplexer 143 (as opposed to the 5-to-1 multiplexer depicted in the example embodiment of FIG. 3). Otherwise, the example embodiment of FIG. 4 incorporating the AND gate 142 is the same as the example depicted in FIG. 3.

Figure 5:
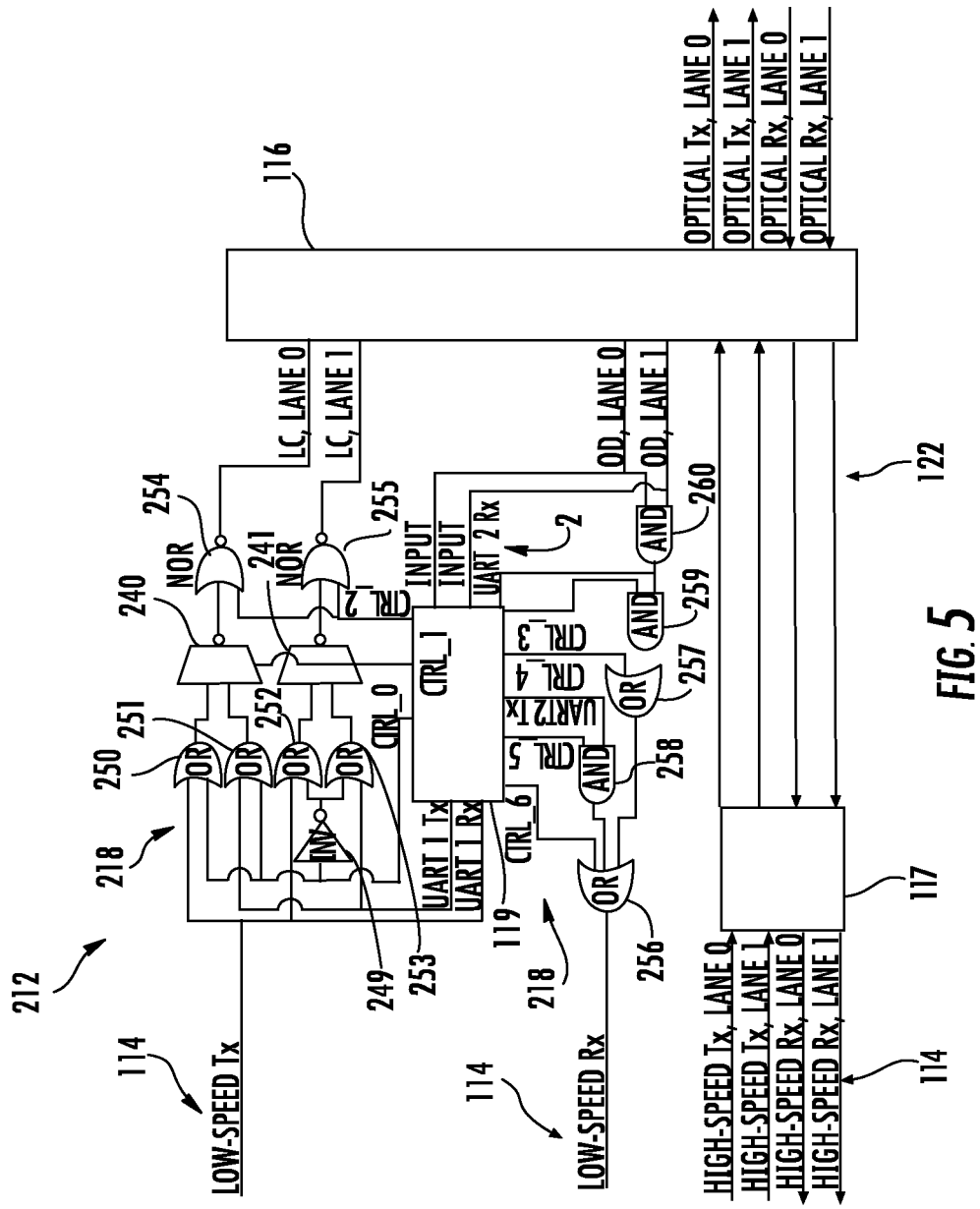
FIG. 5 schematically depicts an example optical engine according to one or more embodiments described and illustrated herein.

Even with the design choice incorporating the AND gate 142 illustrated in FIG. 4, there are many ways of arranging electrical components to realize the functions listed in Tables 1 and 2. FIG. 5 schematically depicts another example optical engine 212 having a control circuit 118 for providing the functions listed in Tables 1 and 2. It should be understood that other components and arrangement of components may be utilized.

Like the example optical engines depicted in FIGS. 3 and 4, the microcontroller 119 of the example optical engine 212 includes a UART 1 Tx pin, a UART 1 Rx pin, a UART 2 Tx pin, a UART 2 Rx, and two inputs connected to OD, lane 0 and OD, lane 1. The microcontroller 119 further comprises the following output pins: Ctrl_0, Ctrl_1, Ctrl_2, Ctrl_3, Ctrl_4, and Ctrl_5. These outputs are provided to the control circuit 218 to route the low-speed data signals as described above and listed in Table 3 below.

First, the components and operation of the transmit path depicted in FIG. 5 will be described. The transmit path of the example control circuit 218 includes four OR gates 250-253 and an inverter 249. The low-speed Tx line is provided as an input to OR gate 250 and OR gate 252. UART 1 Tx is provided as an input to OR gate 251 and OR gate 253. The Ctrl_0 pin is provided as a selector between the low-speed Tx line and UART 1 Tx. The Ctrl_0 pin is provided as an input to OR gate 250 and OR gate 251, and as an input for inverter 249. The output of inverter 249 is provided as an input to OR gate 252 and OR gate 253. Therefore, when the Ctrl_0 pin is driven high, a logical one is provided to OR gates 250 and 251, while a logical zero is provided to OR gates 252 and 253. The opposite is true when the Ctrl_0 pin is driven low. Referring to Table 3 below, when Ctrl_0 is driven low, the low-speed Tx line is connected to either LC, lane 0 or LC, lane 1. When Ctrl_0 is driven high, UART 1 Tx is connected to either LC, lane 0 or LC, lane 1.

TABLE 3

| | Transmit path | | | | |
|---|---|---|---|---|---|
| | Signal routed to VCSELs | | Control signals | | |
| State | LC, lane 0 | LC, lane 1 | Ctrl_0 | Ctrl_1 | Ctrl_2 |
| Route low-speed traffic over lane 0 | Low-speed Tx | 1 | 0 | 0 | 0 |
| Route low-speed traffic over lane 1 | 1 | Low-speed Tx | 1 | 0 | 0 |
| Transmit over lane 0/turn both lasers on | UART 1 Tx | 1 | 0 | 1 | 0 |
| Transmit over | 1 | UART | 1 | 1 | 0 |

TABLE 3-continued

| State | Signal routed to low-speed Rx | Control signals | | | |
|---|---|---|---|---|---|
| | | Ctrl_3 | Ctrl_4 | Ctrl_5 | Ctrl_6 |
| lane 1/turn both lasers on Turn both lasers off | 1 Tx | 0 | 0 | X | X | 1 |

Receive path

| State | Signal routed to low-speed Rx | Control signals | | | |
|---|---|---|---|---|---|
| | | Ctrl_3 | Ctrl_4 | Ctrl_5 | Ctrl_6 |
| Route traffic from either photodiode to low-speed Rx | OD, lane 0 AND OD, lane 1 | 1 | 0 | 0 | 0 |
| Transmit over low-speed Rx | UART 2 Tx | 0 | 0 | 1 | 0 |
| Hold low-speed Rx low | 0 | 0 | 0 | 0 | 0 |
| Hold low-speed Rx high | 1 | X | X | X | 1 |

The example transmit path includes a first 2-to-1 multiplexer 240 and a second 2-to-1 multiplexer 241. The outputs of OR gates 250-253 are provided as inputs to the first and second multiplexers 240 and 241. Both the first and second multiplexers 240, 241 have inverted outputs which are provided as inputs to NOR gate 254 and NOR gate 255, respectively. The output of NOR gate 254 is coupled to LC, lane 0 of the optical transceiver device 116, and the output of NOR gate 255 is coupled to LC, lane 1 of the optical transceiver device 116. The Ctrl_2 pin is also provided as an input to NOR gates 254 and 255.

The Ctrl_1 pin is connected to both the first and second multiplexers 240, 241, and is used to select which input to the first and second multiplexers 240, 241 (i.e., low-speed Tx line or UART 1 Tx) is connected to LC, lane 0 or LC, lane 1, respectively, as shown in Table 3 above. When the Ctrl_2 pin is driven high, the NOR gates 254 and 255 produce a logical low output, which turns off both lasers that are driven by LC, lane 0 and LC, lane 1.

The receive path of the example control circuit 118 comprises AND gates 258-260, OR gate 257, and OR gate 256. The optical detect pins OD, lane 0 and OD, lane 1 are provided as inputs to AND gate 260. AND gate 260 functions similarly to AND gate depicted in FIG. 4. Additionally, OD, lane 0 and OD, lane 1 are also connected to two input pins of the microcontroller 119 to provide additional functionality (e.g., counting pulses of light during sleep mode operation).

The output of AND gate 260 is provided as an input to UART 2 Rx. The microcontroller 119 may be programmed to receive intra-cable signals from the far-end of the optical cable assembly (e.g., intra-cable signals provided by a microcontroller of the far-end of the optical cable assembly).

The output of AND gate 260 is also provided as an input to AND gate 259. The Ctrl_3 pin is provided as the other input to AND gate 259. The output of AND gate 259 is provided as a first input to OR gate 257, while Ctrl_4 is provided as a second input to OR gate 257. AND gate 258 receives the Ctrl_5 pin and UART 2 Tx as inputs, while its output is provided as an input to OR gate 256. The output of OR gate 257 is also provided as an input to OR gate 256. The Ctrl_6 pin is provided as a third input to OR gate 256. The output of OR gate 256 is connected to the low-speed Rx line.

Referring to Table 3, the Ctrl_3 pin and the Ctrl_5 pin are used to connect either the low-speed Rx signals from OD, lane 0 and OD, lane 1, or UART 2 Tx to the low-speed Rx line. When the Ctrl_3 pin, the Ctrl_4 pin, the Ctrl_5 pin and the Ctrl_6 pin are driven low, the low-speed Rx line is held low. When the Ctrl_6 pin is driven high, the low-speed Rx line is held high.

Figure 6:
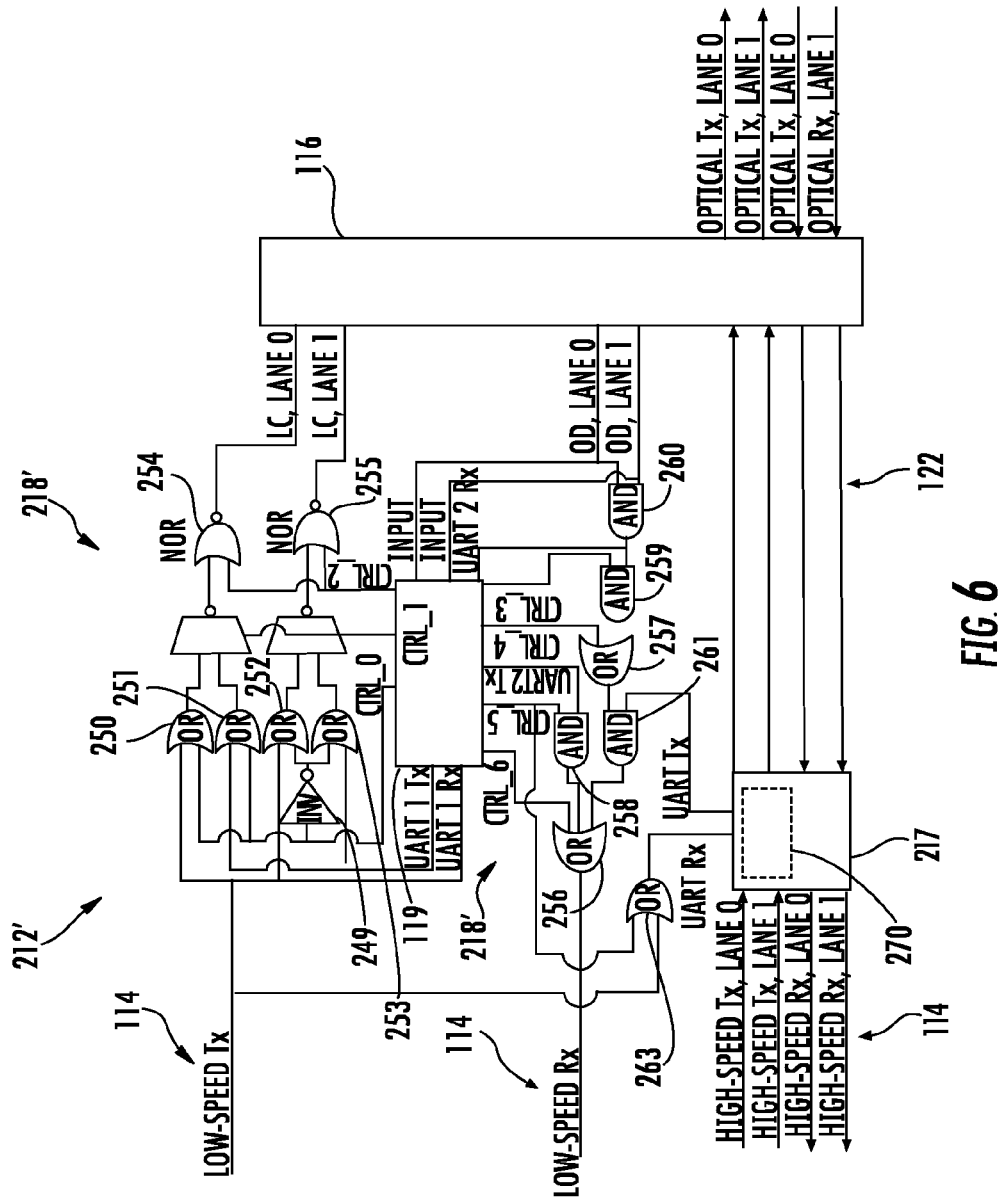
FIG. 6 schematically depicts an example optical engine utilizing two microcontrollers according to one or more embodiments described and illustrated herein.

FIG. 6 depicts yet another example optical engine 212' having a control circuit 218' similar to that depicted in FIG. 5 but where the signal conditioning circuit 217 is configured as a signal conditioning integrated circuit that includes an additional on-board microcontroller 270 that may be utilized to perform some of the on-board communication tasks to manage the four optical lanes as well as manage communication with the near-end host or electronic device.

Generally, it may be advantageous to take advantage of multiple microcontrollers, be they stand-alone or integrated with other ICs, in order to implement division of labor. In the embodiment depicted in FIG. 6, the additional microcontroller 270 is integrated with the signal conditioning circuit 217 IC receives and transmits on the low-speed Rx and Tx lines by UART Tx and UART Rx, while retaining control of what it is able to send and receive. For example, the additional microcontroller 270 should be prevented from receiving requests when the on-board microcontroller 119 needs to transmit to avoid collisions. As an example and not a limitation, UART Tx and UART Rx of the additional microcontroller 270 may be used to respond to frequent requests from the near-end host or electronic device.

More specifically, the control circuit 218' comprises an additional AND gate 261. The Ctrl_5 pin and UART 2 Tx are provided as inputs to AND gate 258 as depicted in FIG. 5. The output of 257 is provided as a first input to AND gate 261, while UART Tx of the additional microcontroller 270 is provided as a second input to AND gate 261. The outputs of AND gate 261 and AND gate 258 are provided as inputs to OR gate 256.

The control circuit 218' further comprises OR gate 263. OR gate 263 receives the low-speed Tx line and Ctrl_5 pin as inputs, while its output is provided to UART Rx of the additional microcontroller 270.

Table 4 below provides a truth table for the schematic depicted in FIG. 6.

TABLE 4

| State | Transmit path | | | | |
|---|---|---|---|---|---|
| | Signal routed to VCSELs | | Control signals | | |
| | LC, lane 0 | LC, lane 1 | Ctrl_0 | Ctrl_1 | Ctrl_2 |
| Route low-speed traffic over lane 0 | Low-speed Tx | 1 | 0 | 0 | 0 |
| Route low-speed traffic over lane 1 | 1 | Low-speed Tx | 1 | 0 | 0 |
| Transmit over lane 0/turn both lasers on | UART 1 Tx | 1 | 0 | 1 | 0 |
| Transmit over lane 1/turn both lasers on | 1 | UART 1 Tx | 1 | 1 | 0 |
| Turn both lasers off | 0 | 0 | X | X | 1 |

TABLE 4-continued

| | Receive path | | | | |
|---|---|---|---|---|---|
| | Signal routed to low-speed | Control signals | | | |
| State | Rx | Ctrl_3 | Ctrl_4 | Ctrl_5 | Ctrl_6 |
| Route traffic from either photodiode or from 270 to low-speed Rx | OD, lane 0 AND OD, lane 1 AND 270's UART Tx | 1 | 0 | 0 | 0 |
| Route traffic from 270 to low-speed Rx | 270's UART Tx | 0 | 0 | 1 | 0 |
| Transmit over low-speed Rx | UART 2 Tx | 0 | 0 | 1 | 0 |
| Hold low-speed Rx low | 0 | 0 | 0 | 0 | 0 |
| Hold low-speed Rx high | 1 | X | X | X | 1 |

The control circuit 218' and the Ctrl_0, Ctrl_1, and Ctrl_2 pins operate in the same manner with respect to the transmit path as described in the embodiment depicted in FIG. 5 and listed in Table 3. The Ctrl_3 pin driven high to route, to the low-speed Rx line, the low-speed Rx signals on OD, lane 0 and OD, lane 1, and the additional microcontroller's 270 UART Tx. Driving the Ctrl_3 low removes OD, lane 0 and OD, lane 1 from the low-speed Rx line, while the Ctrl_4 and Ctrl_5 pins are driven to route either UART Tx from the additional microcontroller 270 or UART 2 Tx to the low-speed Rx line. Driving each of Ctrl_3, Ctrl_4, Ctrl_5 and Ctrl_6 pins low holds the low-speed Rx line low, while driving Ctrl_6 pin high holds the low-speed Rx line high (e.g., during sleep mode operation if the state of the communications link requires it).

As stated above, embodiments of the present disclosure provide a means of transitioning the components with the first and second electrical connectors 110A, 110B at each end of the optical cable assembly 100 (see FIG. 1) into and out of a low-power sleep mode. The sleep mode operations described herein have the ability to detect a communication link state, such as a physical or a logical disconnect or other control change, while also being robust against generating false signals. Further, the sleep mode operations described herein do not require the microcontrollers 119A, 119B of the first and second electrical connectors 110A, 110B to maintain synchronized clocks.

Referring generally to FIGS. 1 and 2, in the mission mode operating state of the optical cable assembly 100, the optical cable assembly 100 receives either management/control data (relatively low speed) and payload data (relatively high-speed) from the electrical interface on the host/device side and transmits both streams of data over the same optical fibers. At the other end, either type of data received optically from the fibers is recovered and retransmitted over the electrical interface.

The sleep mode operation includes putting some of the electronic components (e.g., at least two of the following components: signal conditioning circuit(s), retiming circuit(s), microcontroller(s), laser driver, trans-impedance amplifier, limiting amplifier) into a low-power state that consumes less power than what the electronic components consume when actively transmitting data during mission mode. While in sleep mode, the functionality of the optical engine 112A, 112B is limited but it includes the ability to detect a disconnect event (e.g., a physical disconnect from a host or electronic device, a powering down of the external port connected to the optical cable assembly 100, or a logical shut down of the communication link to the external host or electronic device) and transmit this link status information to the far end of the optical cable assembly 100. Communication between ends of the optical cable assembly 100 is performed by the exchange of repeated optical intra-cable signals. These optical intra-cable signals may be as simple as periodic pulses of light, or may be more complicated, such as data packets of light. The lack of received optical intra-cable signals during a particular period at one end of the optical cable assembly 100 means that the other cable end has been disconnected (either physically or logically). In between providing these optical intra-cable signals, the lasers may be turned off in order to reduce power consumption.

Because the sleep mode optical intra-cable signals described above do not originate from an external host or electronic device (and consequently may not be externally recognized as management/control signals or payload data signal), the optical intra-cable signals exchanged between the optical engines 112A, 112B of the first and second electrical connectors 110A, 110B of the optical cable assembly 100 during sleep mode should not be retransmitted to the external host or electronic device at either end of the optical cable assembly 100. The control circuit 118A, 118B should therefore block this optical intra-cable signaling, while imposing the logic state (high or low) to reflect the current state of the communication link and optical engines 112A, 112B.

Accordingly, the sleep mode methods, optical engines and optical cable assemblies described herein perform the following when transitioning into sleep mode: 1) on the transmit path of the control circuit (e.g., control circuits 118, 118', 218, or 218' of FIGS. 2-6), the microcontroller 119 configures the control circuit to impose the state of the lasers of the optical transceiver device 116 (i.e., on or off), and to transmit optical intra-cable signals depending on the state of the communications link (e.g., connected or disconnected); and 2) on the receive path, the microcontroller 119 listens for optical intra-cable signals from the far end of the optical cable assembly 100, and configures the control circuit to set the required logical value (high or low) of the management/control receive (Rx) lane depending on the state of the communications link.

The sleep mode operation is in contrast with the mission mode operation of the optical cable assembly 100 (when the cable actively transmits data), in which case the control circuit may let the management/control signals travel freely from the external host or electronic device to the optical transceiver device 116, and vice-versa. It is noted that both ends of the optical cable assembly should be coordinated when executing the transition in and out of sleep mode operation.

The trigger to transition to sleep mode is specific to the communication protocol but may include a command from the host or electronic device, or a minimum interval of no data traffic. As used herein, time T is the time corresponding to the uncertainty on the detection of the sleep trigger event. This the longest time that either microcontroller 119A, 119B on each end of the optical cable assembly 100 can take to detect the conditions for entering into sleep mode after the condition is established.

Figure 7:
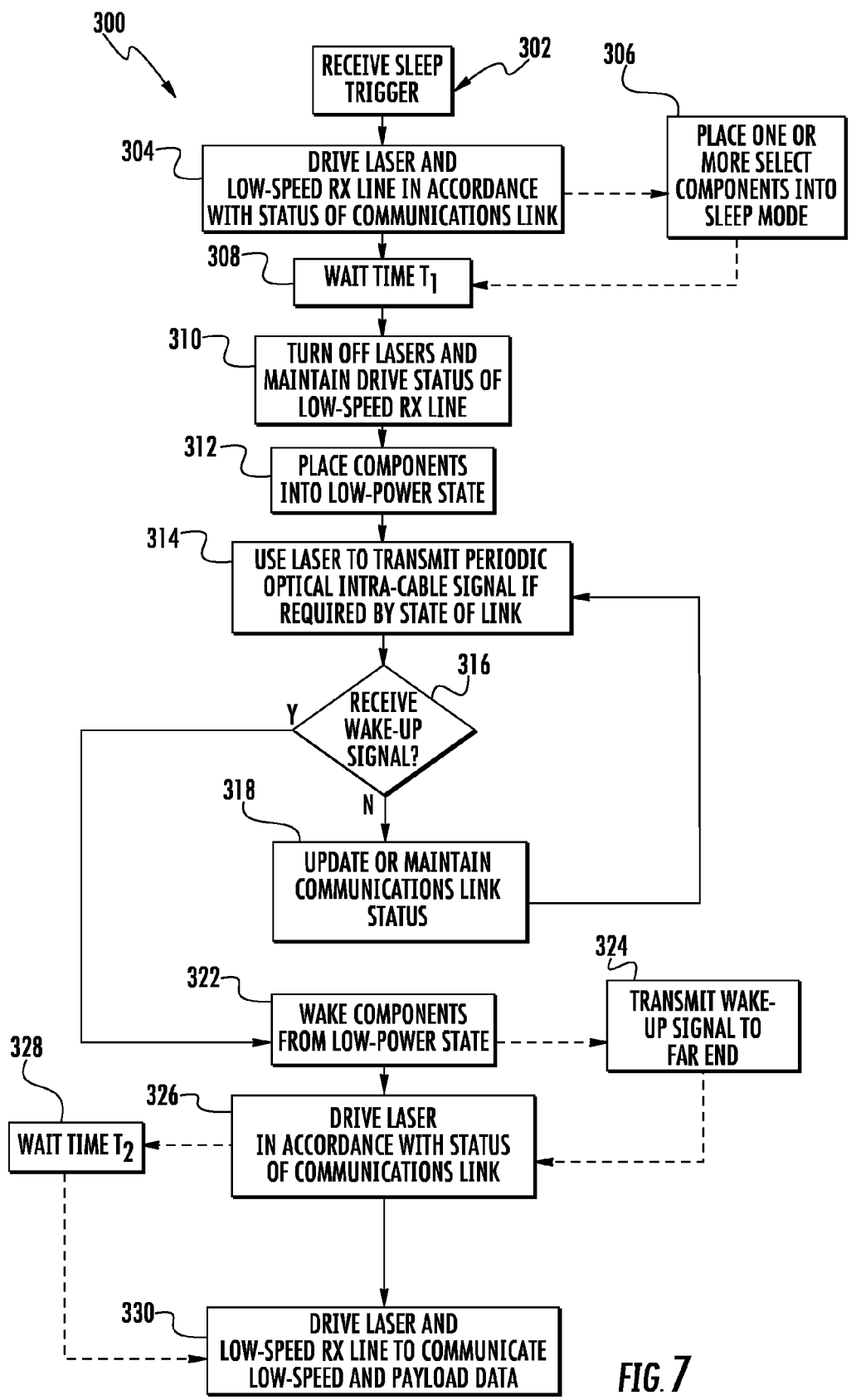
FIG. 7 depicts a flowchart graphically illustrating an example process for transitioning a communications link into and out of a sleep mode according to one or more embodiments described and illustrated herein.

Referring now to FIG. 7, an example method for transitioning an optical engine or an optical cable assembly incorporating an optical engine at each end is graphically illustrated by flowchart 300. It should be understood that embodiments may perform the actions illustrated by the operational blocks of flowchart 300 in an order different than that illustrated in FIG. 7, and that embodiments may include more or fewer operational blocks than depicted in FIG. 7.

At block 302, both ends of the optical cable assembly 100 (e.g., see FIGS. 1-3) receive a sleep trigger signal. The sleep trigger signal may come from the hosts or electric devices connected to the optical cable assembly 100. The sleep trigger signal may also be generated by one or more components of the optical cable assembly 100 when a certain amount of time has elapsed with no data traffic.

At block 304, the control circuit 118 applies appropriate logic level (a fixed logical high or a fixed logical low) to the laser control pins of the optical transceiver device 116 (e.g., applying a logical high to LC, lane 0 and LC, lane 1) and the low-speed Rx line according to the current status of the communications link (e.g., connected or disconnected state). For example, if the electrical connector 110A is connected to a host or electronic device, the laser control pins and the low-speed Rx line may be driven high.

The fixed logical high and/or fixed logical low applied to the laser control pins and the low-speed Rx line are maintained for a time $T_1$ (block 308). Time $T_1$ should be equal to or greater than time T, which is the time corresponding to the uncertainty with respect to the detection of the sleep trigger event. Therefore, maintaining the laser control pins and the low-speed Rx line at the fixed logical high or fixed logical low for time $T_1$ ensures that both ends of the optical cable assembly 100 receive the sleep trigger.

At block 310, the lasers (or laser) are turned off (e.g., applying a logical low to LC, lane 0 and LC, lane 1 of the optical transceiver device 116 using the control circuit 118). The low-speed Rx line is still driven with the same logic level as in block 304 to prevent optical intra-cable signals from reaching the connected host or electronic device. At block 312, components of the optical engine 112 are placed into sleep mode. These components may include, but are not limited to, signal conditioning circuit(s), retiming circuit(s), microcontroller(s), laser driver(s), trans-impedance amplifier(s), and limiting amplifier(s). Placing the components of the optical engine 112 into a low-power state during sleep mode consumes less power than when the components operate in mission mode. The low-power state of the laser driver and receiver components of the optical transceiver device should be able to transmit and detect optical intra-cable signals on at least one optical fiber during sleep mode.

In some embodiments, select components of the optical engine 112 may be placed into a low-power state at any time following block 304. As shown in block 306, select components, such as signal conditioning circuit(s) and retiming circuit(s), may be placed into a lower-power state after driving the laser control pin(s) and low-speed Rx line with the fixed logic levels at block 304, in some embodiments.

One or more lasers are used to send optical intra-cable signals to the far end of the optical cable assembly 100 over at least one optical fiber at block 314. These optical intra-cable signals are used by the optical engine 112 to determine whether or not the far end of the optical cable assembly 100 is still connected to a host or electronic device. It is noted that optical intra-cable signals are transmitted only if both ends of the communications link (i.e., optical cable assembly 100) are connected. Transmission of these optical intra-cable signals indicates to the far end of the optical cable assembly 100 that the near end is still connected to a host or electronic device. The optical intra-cable signal may be a simple pulse of light, or a more complex packet of light pulses.

A wake-up signal may be sent by the host or electronic device at either end of the optical cable assembly 100. Additionally, a wake-up signal may be received by an optical engine 112 from the opposite end of the optical cable assembly. For example, a first end of the optical cable assembly 100 (i.e., at the first electrical connector 110A) may first receive a wake-up signal from the host or electronic device to which it is connected. Following a period of time, the first end of the optical cable assembly 100 may send an intra-cable wake-up signal to the second end of the optical cable assembly 110 (i.e., at the second electrical connector 110B). In this example, the first end of the optical cable assembly 100 receives the wake-up signal first, while the second end of the optical cable assembly 100 receives the wake-up signal second.

If no wake-up signal is received at or prior to block 316 (by either the connected host/electronic device or by the intra-cable signal), then the sleep mode continues to block 318 where the status of the communications link is either updated or maintained. More specifically, the optical engine 112 may use the receiver circuit of the optical transceiver device 116 to check for a corresponding optical intra-cable signal from the far end of the optical cable assembly 100. The intra-cable signal may be indicative of a change in the status of the communications link (e.g., the far end of the optical cable assembly 100 may have been physically or logically disconnected or connected). As an example and not a limitation, the microcontroller 119 may change the logic level at the low-speed Rx line to update the status of the communications link based on receipt or non-receipt of an intra-cable signal from a far end of the optical cable assembly 100 (e.g., transition from a logical high, which may be indicative of the far end being connected, to a logical low, which may be indicative of the far end being disconnected). The process then moves back to block 314, where another optical intra-cable signal is sent to the far end after a predetermined period of time. In this manner, periodic optical intra-cable signals are sent to opposite ends of the optical cable assembly 100 by the optical engines 112A, 112B.

If a wake-up signal is received at or before block 316 either from the connected host/electronic device or intra-cable signal from a far end of the optical cable assembly 100, then the process moves to block 322 where the components of the optical engine 112 are brought out of the respective low-power states and into their normal operational mode.

In some embodiments, where the wake-up signal is received from a connected host or electronic device (e.g., on the low-speed Tx line), an intra-cable wake-up signal may be sent by the optical transceiver device 116 to the far end of the optical cable assembly 100 (block 324). The intra-cable wake-up signal, which may be configured as a simple pulse of light of a particular duration or a digital byte or an entire packet, instructs the far end to wake-up from sleep mode in the case where the near end received the wake-up signal from a host or electronic device. The end of the optical cable assembly that receives a wake-up signal second by the intra-cable wake-up signal moves directly to block 322 without transmitting its own a wake-up signal.

At block 326, the lasers (or laser) of the optical transceiver device 116 are driven in accordance with the status of the communications link. The lasers may be turned on or off depending on the particular communication protocol to reflect the logical status of the connection of the communications link. For example, the lasers may be turned on to indicate a connected status, and off to indicate a disconnected status.

When the optical engine 112 receives the wake-up signal first from the host or electronic device, the process moves to block 328 where the engine process waits for a time $T_2$, which should be sufficiently long to give the far end of the cable assembly 100 enough time to wake up its components from the low-power state.

Then the process moves to block 330, where the laser control pins (or single laser control pin if only one laser is provided) and the low-speed Rx line are driven in accordance with normal operation, such as transmission of low-speed management/control data and/or transmission of high-speed payload data between electronic devices coupled by the optical cable assembly 100.

However, when the optical engine 112 receives the wake-up signal second by an intra-cable signal (i.e., it receives the wake-up signal second), the process moves directly from block 326 to block 330 without waiting time $T_2$ at block 328.

It should now be understood that embodiments described herein are directed to optical engines, optical cable assemblies, and methods for transitioning a communications link capable of transmitting and receiving low-speed signals (e.g., control signals or management signals) in a pass-through architecture into and out of a sleep mode. Embodiments described herein further prevent optical intra-cable signals from being passed to connected host devices or electronic devices during sleep mode.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A method of operating a sleep mode of an optical cable assembly comprising an optical transceiver device, the method comprising:
   receiving a sleep trigger at the optical cable assembly;
   for a time $T_1$, turning a laser of an optical Tx lane of the optical transceiver device on or off and providing a fixed logical high or a fixed logical low on low-speed Rx line of the optical cable assembly based on a connection state of an electrical connector of the optical cable assembly;
   after the time $T_1$, turning off the laser of the optical Tx lane and maintaining the fixed logical high or the fixed logical low on the low-speed Rx line of the optical cable assembly;
   placing one or more components of the optical transceiver device into a low-power state; and
   periodically transmitting an optical intra-cable signal from the optical Tx lane of the optical transceiver device over an optical fiber to a far end of the optical cable assembly.

2. The method of claim 1, further comprising receiving an optical intra-cable signal from the far end of the optical cable assembly.

3. The method of claim 1, further comprising:
   receiving a wake-up signal at the optical cable assembly;
   waking the one or more components of the optical transceiver device from the low-power state;
   transmitting an optical intra-cable wake-up signal from the optical Tx lane to the far end of the optical cable assembly;
   for a time $T_2$, turning the laser of the optical Tx lane on or off based on the connection state of the electrical connector; and
   following the time $T_2$, removing the fixed logical high or the fixed logical low from the low-speed Rx line, and enabling operation of the laser of the optical Tx lane.

4. The method of claim 3, wherein removal of the fixed logical high or the fixed logical low from the low-speed Rx line enables data to be provided from the optical cable assembly to an electronic device connected to the electrical connector, and enabling operation of the laser of the optical Tx lane allows transmission of optical signals on the optical Tx lane.

5. The method of claim 1, wherein the one or more components of the optical transceiver device placed into the low-power state comprises a laser driver circuit and a trans-impedance amplifier circuit.

6. The method of claim 5, wherein the one or more components of the optical transceiver device placed into the low-power state further comprises one or more retiming circuits and/or one or more signal conditioning circuits.

7. The method of claim 6, wherein the one or more retiming circuits and/or the one or more signal conditioning circuits are placed into the low-power state at any time following receipt of the sleep trigger.

8. The method of claim 1, wherein the optical intra-cable signals are periodic single pulses of light.

9. The method of claim 1, wherein the optical intra-cable signals are periodic packets of pulses of light.

10. An optical engine comprising:
    a low-speed Rx line;
    a low-speed Tx line;
    an optical transceiver device comprising:
        a laser control input;
        an optical detect output;
        an optical Tx lane, wherein the optical transceiver device converts an electrical Tx signal into an optical Tx signal by a laser of the optical Tx lane;
        an optical Rx lane, wherein the optical transceiver device converts an optical Rx signal into an electrical Rx signal; and
    a control circuit communicatively coupled to the low-speed Rx line and the low-speed Tx line, the laser control input, and the optical detect output, wherein the control circuit is configured to:
    receive a sleep trigger;
    for a time $T_1$, provide a logical high or a logical low on the laser control input and provide a fixed logical high or a fixed logical low on the low-speed Rx line based on a connection state of the optical engine;
    turn off the laser of the optical Tx lane;
    place one or more components of the optical transceiver device into a low-power state;
    periodically transmit an optical intra-cable signal from the optical Tx lane of the optical transceiver device; and
    receive an optical intra-cable signal at the optical Rx lane.

11. The optical engine of claim 10, wherein the control circuit is further configured to:
receive a wake-up signal on the low-speed Tx line;
wake the one or more components of the optical transceiver device from the low-power state;
transmit an optical intra-cable wake-up signal from the optical Tx lane;
for a time $T_2$, provide a logical high or a logical low on the laser control input based on the connection state of the optical engine; and
following the time $T_2$, remove the fixed logical high or the fixed logical low from the low-speed Rx line, and remove the fixed logical high or the fixed logical low from the laser control input.

12. The optical engine of claim 11, wherein removal of the fixed logical high or the fixed logical low from the low-speed Rx line enables data to be provided from the optical engine to the electronic device in communication with the optical engine, and removal of the fixed logical high or the fixed logical low from the laser control input enables data to be provided on the optical Tx lane.

13. The optical engine of claim 10, wherein the one or more components of the optical transceiver device placed into the low-power state comprises a laser driver circuit and a trans-impedance amplifier circuit.

14. The optical engine of claim 13, wherein the one or more components of the optical transceiver device placed into the low-power state further comprises one or more signal conditioning circuits.

15. The optical cable assembly of claim 10, wherein:
the control circuit is further configured to:
receive an intra-cable wake-up signal;
wake the one or more components of the optical transceiver device from the low-power state;
provide a logical high or a logical low on the laser control input based on the connection state of the first electrical connector or the second electrical connector; and
remove the fixed logical high or the fixed logical low from the low-speed Rx line, and remove the fixed logical high or the fixed logical low from the laser control input.

16. The optical engine of claim 10, wherein the optical intra-cable signals are periodic single pulses of light.

17. The optical engine of claim 10, wherein the optical intra-cable signals are periodic packets of pulses of light.

18. An optical cable assembly comprising:
an optical cable having a first end and a second end, the optical cable comprising a plurality of optical fibers;
a first electrical connector disposed at the first end of the optical cable and a second electrical connector disposed at the second end of the optical cable, each of the first electrical connector and the second electrical connector comprising a housing and an optical engine disposed within the housing, the optical engine comprising:
a low-speed Rx line;
a low-speed Tx line;
an optical transceiver device comprising:
a laser control input;
an optical detect output;
an optical Tx lane optically coupled to a first optical fiber, wherein the optical transceiver device converts an electrical Tx signal into an optical Tx signal by a laser of the optical Tx lane;
an optical Rx lane optically coupled to a second optical fiber, wherein the optical transceiver device converts an optical Rx signal on the second optical fiber into an electrical Rx signal; and
a control circuit communicatively coupled to the low-speed Rx line and the low-speed Tx line, the laser control input, and the optical detect output, wherein the control circuit is configured to:
receive a sleep trigger;
for a time $T_1$, provide a logical high or a logical low on the laser control input and provide a fixed logical high or a fixed logical low on the low-speed Rx line based on a connection state of the first electrical connector or the second electrical connector;
turn off the laser of the optical Tx lane;
place one or more components of the optical transceiver device into a low-power state;
periodically transmit an optical intra-cable signal from the optical Tx lane of the optical transceiver device over an optical fiber to a far end of the optical cable assembly; and
receive an optical intra-cable signal from the far end of the optical cable assembly.

19. The optical cable assembly of claim 18, wherein:
the control circuit is further configured to:
receive a wake-up signal on the low-speed Tx line;
wake the one or more components of the optical transceiver device from the low-power state;
transmit an optical intra-cable wake-up signal to the far end of the optical cable assembly;
for a time $T_2$, provide a logical high or a logical low on the laser control input based on the connection state of the first electrical connector or the second electrical connector; and
following the time $T_2$, remove the fixed logical high or the fixed logical low from the low-speed Rx line, and remove the fixed logical high or the fixed logical low from the laser control input.

20. The optical cable assembly of claim 19, wherein removal of the fixed logical high or the fixed logical low from the low-speed Rx line enables data to be provided from the optical cable assembly to an electronic device connected to the first electrical connector or the second electrical connector, and directly connects the low-speed Tx line to the laser control input.

21. The optical cable assembly of claim 18, wherein the one or more components of the optical transceiver device placed into the low-power state comprises a laser driver circuit and a trans-impedance amplifier circuit.

22. The optical cable assembly of claim 21, wherein the one or more components of the optical transceiver device placed into the low-power state further comprises one or more retiming circuits and one or more signal conditioning circuits.

23. The optical cable assembly of claim 18, wherein:
the control circuit is further configured to:
receive an intra-cable wake-up signal;
wake the one or components of the optical transceiver device from the low-power state;
provide a logical high or a logical low on the laser control input based on the connection state of the first electrical connector or the second electrical connector; and
remove the fixed logical high or the fixed logical low from the low-speed Rx line, and remove the fixed logical high or the fixed logical low from the laser control input.

24. The optical cable assembly of claim 18, wherein the optical intra-cable signals are periodic single pulses of light.

25. The optical cable assembly of claim 18, wherein the optical intra-cable signals are periodic packets of pulses of light.

\* \* \* \* \*